April 20, 1948.  H. C. WENDT  2,439,835
VOLT-AMPERE METER
Filed Aug. 21, 1946
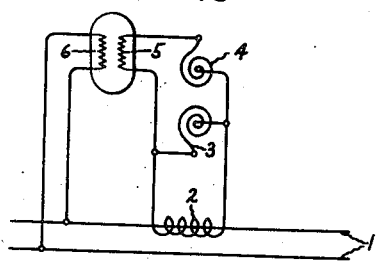
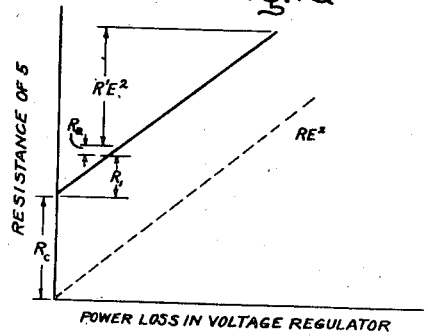
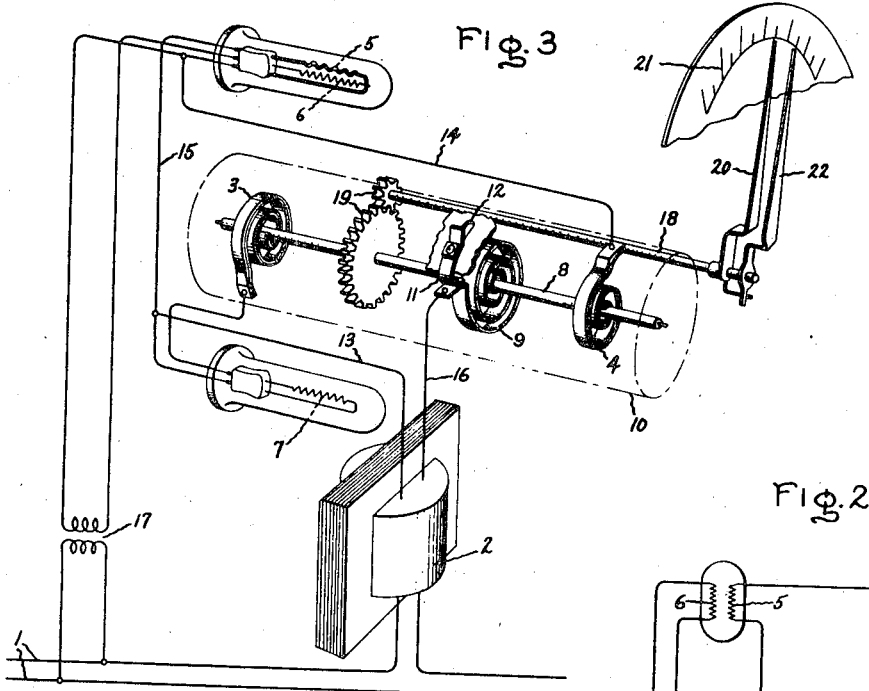
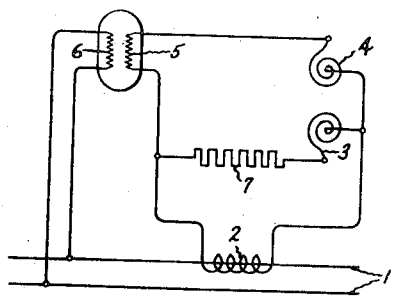
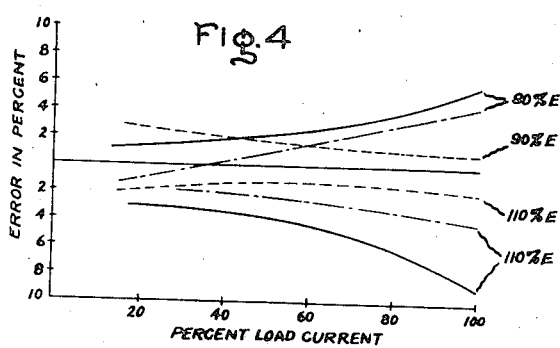
Inventor:
Harry C. Wendt,
by Prowell S. Wheels
His Attorney.

Patented Apr. 20, 1948

2,439,835

UNITED STATES PATENT OFFICE 2,439,835

VOLT-AMPERE METER

Harry C. Wendt, Lynnfield, Mass., assignor to General Electric Company, a corporation of New York Application August 21, 1946, Serial No. 692,081

4 Claims. (Cl. 171—95)

My invention relates to improvements in the type of thermal volt-ampere meter described in United States Letters Patent No. 2,350,170 to Kinnard, assigned to the same assignee as the present invention. My improvement relates to means for compensating this type of meter for certain errors which are inherent therein to the end that accurate metering results may be obtained over wide ranges of ambient temperature variations and wide ranges of metering current variations.

The features of my invention which are believed to be novel and patentable will be pointed out in the claims appended hereto. For a better understanding of my invention, reference is made in the following description to the accompanying drawing in which Fig. 1 represents a circuit diagram of a thermal volt-ampere meter such as is shown in Fig. 1 of the above-mentioned patent; Fig. 1a shows curves explanatory of errors compensated for by my invention; Fig. 2 represents a circuit diagram of a thermal volt-ampere meter including a compensating resistor in accordance with my invention; Fig. 3 represents the essential physical embodiment of the invention in a meter; and Fig. 4 represents comparison load accuracy curves of uncompensated and compensated meters.

In the circuit of the meter of the Kinnard patent, Fig. 1, current from a power line 1 is proportionally reduced by a current transformer 2 and divides through parallel circuits containing similar bimetallic spiral resistors 3 and 4. The spirals 3 and 4 produce opposing torques on a common shaft in accordance with their heating. The division of current from the current transformer 2 through the spirals 3 and 4 is controlled by a variable resistance 5 having a positive temperature coefficient of resistance and heated by a resistor 6 through which a current flows which is proportional to the voltage of line 1. Spiral 3 thus carries the larger current and spiral 4 the smaller current, and spiral 3 produces the predominating torque. If the currents through 3 and 4 be represented by $I_3$ and $I_4$ the line current by $I$ and the line voltage by $E$, the predominating torque produced will be proportional to $(EI)^2$ when $I_3$ is proportional to $I+E^2I$ and $I_4$ is proportional to $I-E^2I$. The heating of the spirals is proportional to the square of their currents. Thus the heating of spiral 3 should be proportional to $I^2+2(EI)^2+E^4I^2$ and the heating of spiral 4 should be proportional to $I^2-2(EI)^2+E^4I^2$ so that the difference in heating or resulting torque should be proportional to $4(EI)^2$ or proportional to volt-amperes squared. This condition may be achieved by making the differential resistance of the circuit of spiral 3 and that of spiral 4 proportional to $E^2$.

The Kinnard scheme is prevented from being theoretically accurate by reason of the fact that an initial differential resistance exists due to the cold resistance of resistor 5. Also the current from the current transformer which flows in resistor 5 causes its heating and variation in its resistance, and its resistance is also influenced by ambient temperature changes. Hence, the differential resistance is not controlled solely by the voltage, and the meter will have an error to the extent by which the current division in spirals 3 and 4 departs from the theoretically correct division by reason of these factors which are not related to voltage. Thus the differential resistance could be made to vary approximately as the square of the voltage and hence effect the correct division of currents only if the cold resistance of 5 is negligible to its hot resistance. Also an increase in ambient temperature will reduce current in spiral 4 and increase it in spiral 3, and an increase in line current will increase the current in spiral 3 at a greater rate than in spiral 4 because these changes increase the heating of resistor 5 and likewise its resistance and are not related to the voltage $E$, which is supposed to have full control of the variable resistor 5.

The reason for the main errors in Kinnard's scheme is illustrated in the curve of Fig. 1a where the abscissas represent power lost in the voltage regulator and the ordinates represent the resistance of 5. For correct measurement results the resistance of 5 should be zero at zero voltage and increase as the square of the voltage, such as represented by the dotted line $RE^2$ which passes through the zero resistance point at zero power loss. However, resistance 5 has an initial cold resistance represented by the value $Rc$. The increment in resistance due to current flow through 5 may be represented by a value $R_1$ which of course varies. There is a variable change in resistance due to ambient temperature changes represented by $Ra$, and there is the desired change in resistance due to voltage heating represented by $R'E^2$. While the solid line curve $O$, $Rc$, $R_1$, $Ra$, $R'E^2$ is schematic and not a true curve because the components thereof overlap and occur simultaneously, it is evident that the characteristic thereof may depart materially from the desired dotted line curve $RE^2$, and that the desired characteristic will be approached only as the components $Rc$, $R_1$ and $Ra$ are made very small compared to component $R'E^2$. This however, compromises the design and limits the useful measurement range.

In my scheme these components are still present in the circuit of spiral 4 but are largely canceled out by also including them in the circuit of spiral 3 by means of the compensating resistance 7, Fig. 2, of the correct resistance and temperature coefficient. $Rc$ may be completely canceled out by the cold resistance of 7 if made equal to the cold resistance of 5. If 7 has the same temperature coefficient of resistance as 5, $R_1$ is largely canceled out but not completely because the currents in the parallel circuits are not equal. The ambient temperature component $Ra$ is now the same in both circuits and cancels. The effective differential resistance characteristic of the two parallel current circuits may thus be made more nearly that represented by the dotted line $RE^2$, Fig. 1a, and by some further minor changes in the relations of the resistances and their temperature coefficients in the parallel circuits determined by tests under usual operating conditions, the desired characteristic may be approached very closely. Thus, in accordance with my invention I include a resistor 7 having a positive temperature coefficient of resistance in the high current meter branch designed in relation to the voltage controlled resistor 5 to balance or cancel the errors above explained and to maintain substantially the theoretically correct distribution of current flow between the spirals 3 and 4 when once established over expected ranges of variation in line voltage and current.

The resistance 7 should have approximately the same resistance as 5 at the same temperature, approximately the same temperature coefficient, and approximately the same variation in resistance with changes in current, and both resistances 5 and 7 should have such relation to the values of the resistances of the torque spirals 3 and 4 as to provide a practicable meter.

Referring now to Fig. 3, the complete meter comprises a torque shaft 8 on which the torque spirals 3 and 4 are secured at their inner ends. The shaft 8 is of conducting material and current is led into the spirals 3 and 4 by means of a third spiral 9 which is not of bimetal and contributes no torque but serves merely as a lead-in spiral and to adjust the zero setting of the meter, and its outer normally stationary end is adjustable for that purpose.

Surrounding the shaft 8 and the spirals is a shell 10 encasing these parts and providing a desirable amount of thermal insulation. The outer ends of the spirals are secured in fixed relation to the casing, and the clip 11 for the lead-in spiral 9 is secured in a slot 12 in the casing to permit limited adjustment of the outer end of this spiral.

Spirals 3 and 4 are of bimetal, the inner side of which has a temperature coefficient of expansion greater than the outer side so that when these spirals are heated, they tend to uncoil and since their outer ends are fastened, their expansion and contraction produce torques on shaft 8. Thus spiral 3 tends to rotate shaft 8 counter-clockwise and spiral 4 tends to rotate shaft 8 clockwise when these spirals are heated by current flow therethrough. The outer end of spiral 3 is connected to one side of the secondary of current transformer 2 through resistance 7 and wire 13, and the outer end of spiral 4 is connected to the same side of the secondary of current transformer 2 through resistance 5 and wires 14 and 15. The opposite side of the secondary of current transformer 2 connects to the inner ends of spirals 3 and 4 through line 16, lead-in spiral 9, and shaft 8. It is thus seen that the spirals 3 and 4 are connected in parallel circuits to the secondary of the current transformer 2, spiral 9 through the voltage regulated resistance 5, and spiral 3 through the compensating resistance 7. Generally the greater amount of current passes through spiral 3 and it produces the greater torque (counterclockwise). This current is proportional to $I+E^2I$ where $I$ and $E$ represent line current and voltage. The heating in spiral 3, and the torque produced is proportional to $(I+E^2I)^2$. Spiral 4 carries a current proportional to $I-E^2I$ and it produces a clockwise torque on shaft 8 proportional to $(I-E^2I)^2$. If there were a zero voltage condition with flow of line current as, for example, by cutting the voltage line to the heater 6 through voltage transformer 17, the line current would divide equally through spirals 3 and 4, and the resultant torque would be zero. The heating for regulating and temperature compensating purposes in resistances 5 and 7 produces no torque on shaft 8. The rotary movement of shaft 8 is transferred to a shaft 18 through motion multiplying gears at 19. There is a pointer 20 on shaft 18 cooperating with a volt-ampere scale 21, and a maximum demand friction pointer 22 may be provided which is pushed up scale by pointer 20 and remains in the maximum position until reset by hand.

In the form of meter shown in Fig. 1 of the previously mentioned Kinnard patent the current which flowed through resistance 5 produced some heating of such resistor, particularly at the higher line current values, which heating and resulting change in resistance were not compensated for and which therefore resulted in a departure of the division of the current in spirals 3 and 4 from that required for correct measurement and resulted in error. The error produced was a maximum at low values of voltage and high values of current, and minimum at high values of voltage and low values of current, and hence, was far from constant and therefore impossible to deal with in the calibration of the meter. As a consequence the meter was reasonably accurate only over a fairly low range of load current values, and the voltage watt loss in the voltage heater regulator resistance 6 was made higher than desirable in order to have it predominate over the initial cold resistance and the self-heating of resistor 5 due to current flow therein and the effects of ambient temperature variations. A considerable improvement in accuracy and a more practicable and economic meter from the operating standpoint and within acceptable accuracy limits over a much wider range of line current are obtained by the use of my invention, where the resistor 7 is used to balance the cold resistance and to compensate for the ambient temperature changes in resistance and self-heating changes in resistance of the temperature sensitive voltage regulator 5. The compensation produced is not perfect because it varies slightly with variation in voltage and the division of line current in resistances 5 and 7. Also there are other factors that should be considered in the final design of the meter, such as the thermal relation of the physical parts of the meter, differences in the resistance temperature coefficient of the bimetal spirals 3 and 4 at different temperatures and inequality of resistances of the bimetal spirals at different temperatures.

It is therefore desirable to balance the characteristics of the component parts and use values of resistances etc. which may vary slightly from what would appear to be the optimum previously suggested. This is illustrated by the accuracy curves represented in Fig. 4 for three different meter designs. The full line accuracy curves are for an equivalent uncompensated meter similar to that of the previously mentioned patent, where the resistances of bimetal spirals 3 and 4 were each of 0.1 ohm cold or at room temperature and the voltage control resistance 5 was 0.03 ohm at rated voltage. The meter was tested from zero to 100 per cent rated load at 90 and 110 per cent voltages. It is seen that the uncompensated meter error increases with load and has a six per cent positive error at 90 per cent voltage and full load and a nine per cent negative error at 110 per cent voltage and full load.

The dash dot lines represent the same meter compensated with a nickel wire resistance 7 of 0.01 ohm cold or at room temperature. It will be noted that this produces a decided improvement in accuracy, particularly at full load, the improvement being greatest at 110 per cent voltage.

The dotted line accuracy curves are for a meter having a bimetal spiral 3 of 0.055 ohm and a bimetal spiral 4 of 0.058 ohm at room temperature. The voltage control resistance 5 was 0.026 ohm at room temperature and 0.052 ohm at rated voltage, had the compensating resistance 7 was 0.027 ohm at room temperature. The resistance 5 was made of iron and resistance 7 of nickel. The heater resistor 6 was 3.18 ohms. The accuracy for this last meter is very much improved, particularly at the higher loads where the need for compensation is greatest.

What I claim as new and desire to secure by Letters Patent of the United States is:

1. Apparatus for measuring the product of two quantities comprising a differential electrical measuring instrument having a pair of energizing circuits and responsive to the difference in the flow of current in said energizing circuits, means for energizing said circuits in parallel by currents the total of which is proportional to one of said quantities, a regulator in one of said energizing circuits comprising a temperature sensitive resistor heated in response to the other of said quantities for varying the relative flow of the currents in the parallel energizing circuits, and a resistor contained in the other energizing circuit of the same order of resistance magnitude and temperature sensitivity as said regulator resistor for the purpose of compensating for the cold resistance of the regulator resistor and for changes in its resistance due to current flow therein and for ambient temperature changes.

2. A meter for measuring the volt-amperes of a measurement circuit comprising a differential electrical measuring instrument having a pair of energizing circuits and responsive to the difference in the flow of current in said energizing circuits, means for energizing both of said energizing circuits in parallel by currents the sum of which is proportional to the current to the measurement circuit, a temperature sensitive resistor regulator in one of said energizing circuits which is heated in proportion to the voltage of the measurement circuit as well as by current flow therethrough, and a substantially similar temperature sensitive resistor in the other energizing circuit heated only by the current flow therethrough for compensating for the cold resistance and changes in resistance of the regulator resistor other than those caused by such voltage heating.

3. A volt-ampere meter comprising a differential thermal meter having two energizing circuits connected in parallel, means for energizing said circuits by currents the sum of which is proportional to the measurement amperes, said circuits containing approximately similar measurement heaters, one circuit containing a voltage regulating temperature sensitive resistor, and the other circuit containing a resistor for compensating for resistance components of the voltage regulating resistor which are unrelated to voltage variations, the voltage regulating resistor and compensating resistor having approximately equal resistance and similar positive temperature coefficients of resistance and each having approximately one-half of the resistance of one of the measurement heaters.

4. A thermal volt-ampere meter comprising a shaft, a pair of approximately similar bimetal spirals arranged to produce opposed torques on said shaft when heated, parallel circuits each circuit containing one of said spirals, means for energizing said circuits with currents the sum of which is proportional to the measurement amperes, a temperature sensitive regulator resistor in one of said parallel circuits, means for heating said regulator resistor in proportion to measurement volts to control the division of the current in the parallel circuits, and a compensating resistor in the other parallel circuit for compensating for the resistance components of the regulator resistor which are not related to voltage variations, the regulator resistor and compensating resistor having approximately the same resistance and positive temperature coefficient of resistance, with a cold resistance approximately one-half that of the cold resistance of one of said bimetal spirals, and the resistance of the regulator resistor being approximately twice its cold resistance when heated at rated voltage.

HARRY C. WENDT.